Jan. 17, 1967 R. E. YAMARONE ETAL 3,299,404

DETECTION CIRCUIT RESPONSIVE TO PULSE DURATION AND FREQUENCY

Filed Dec. 28, 1962 3 Sheets-Sheet 1

INVENTORS R. E. YAMARONE
H. M. ZYDNEY
BY
R. C. Lipton
ATTORNEY

DETECTION CIRCUIT RESPONSIVE TO PULSE DURATION AND FREQUENCY

Filed Dec. 28, 1962

Jan. 17, 1967 R. E. YAMARONE ETAL 3,299,404

DETECTION CIRCUIT RESPONSIVE TO PULSE DURATION AND FREQUENCY

Filed Dec. 28, 1962 3 Sheets-Sheet 3

United States Patent Office 3,299,404

Patented Jan. 17, 1967

3,299,404

DETECTION CIRCUIT RESPONSIVE TO PULSE DURATION AND FREQUENCY

Ronald E. Yamarone, Staten Island, and Herbert M. Zydney, New York, N.Y., assignors to Bell Telephone Laboratories, Incorporated, New York, N.Y., a corporation of New York Filed Dec. 28, 1962, Ser. No. 248,044
7 Claims. (Cl. 340—167)

This invention relates to tone detectors for data transmission sets and, more particularly, to circuits for detecting call progress tones returned by a telephone central office to the data set.

A broad object of this invention is to provide an improved circuit for automatically detecting tone signals.

In the application of T. L. Doktor, G. Parker and H. M. Zydney, Serial No. 248,045, filed concurrently herewith, there is disclosed a data transmission set connected to the telephone switching network by way of a conventional telephone subscriber line. The data set is arranged to communicate by frequency-shift voice signals comprising tones corresponding to the mark and space signal elements of the data characters. In addition, switching contacts, a dial and a listen-only handset are provided to originate a call by operating the switching contacts to send an off-hook signal to the telephone office, dial the appropriate digits of the desired remote subscriber and monitor the call progress tones, such as the busy, no-such-number and audible ring signals. In certain applications, however, it is desirable that the call progress tones returned by the telephone office be recognized automatically at the subscriber set.

Accordingly, it is an object of this invention to detect automatically telephone call progress tone signals.

Call progress tone signals, as is well known in the telephone art, comprise successive tone and "no-tone" intervals, the duration of the "no-tone" interval identifying the particular call progress tone signal. For example, a "no-tone" interval of approximately 300 milliseconds designates a busy signal, a "no-tone" interval of approximately 800 milliseconds designates a no-such-number signal and a "no-tone" interval exceeding one second designates an audible ring signal. The tone interval may be made up of sequential "on" and "off" pulses, each pulse having a duration of 25 milliseconds, for example. Since the subscriber in this case is provided with a data set which recognizes frequency-shift mark and space tones, the "on" and "off" pulses are preferably converted to mark and space tones in a conventional manner. These mark and space tones may then be detected by the data set and the original "on" and "off" pulses recovered.

Since the data set receiver only accepts signals within a narrow voice signal band, the utilization of the data tones has the advantage of eliminating noise falling outside of the signal band frequency. The receiver, however, cannot discriminate against voice frequency noise and prolonged data tones.

It is another object of this invention to reject voice frequency noise and prolonged data tones.

In accordance with the illustrated embodiment of the present invention, the recovered pulses are applied in parallel to a pulse width detector circuit and a pulse transition detector circuit. The pulse width detector circuit comprises a signal rectifier for rectifying the pulses, a threshold circuit for passing the portion of each pulse exclusive of the pulse transition interval and an integrating circuit for providing an output when the passed pulse portion exceeds a predetermined width whereby short duration noise pulses are eliminated. The pulse transition detector circuit comprises a differentiating circuit for providing a pulse spike in response to each pulse transition and an integrating circuit for providing an output when the transition frequency exceeds a predetermined rate whereby prolonged data tones are eliminated. The coincidence of the two outputs is detected and the resultant signal thereof is applied to timing and logic circuits to identify the call progress tone.

The foregoing and other objects and features of this invention will be fully understood from the following description and an illustrative embodiment thereof taken in conjunction with the accompanying drawings, wherein.

Figures 1, 4:
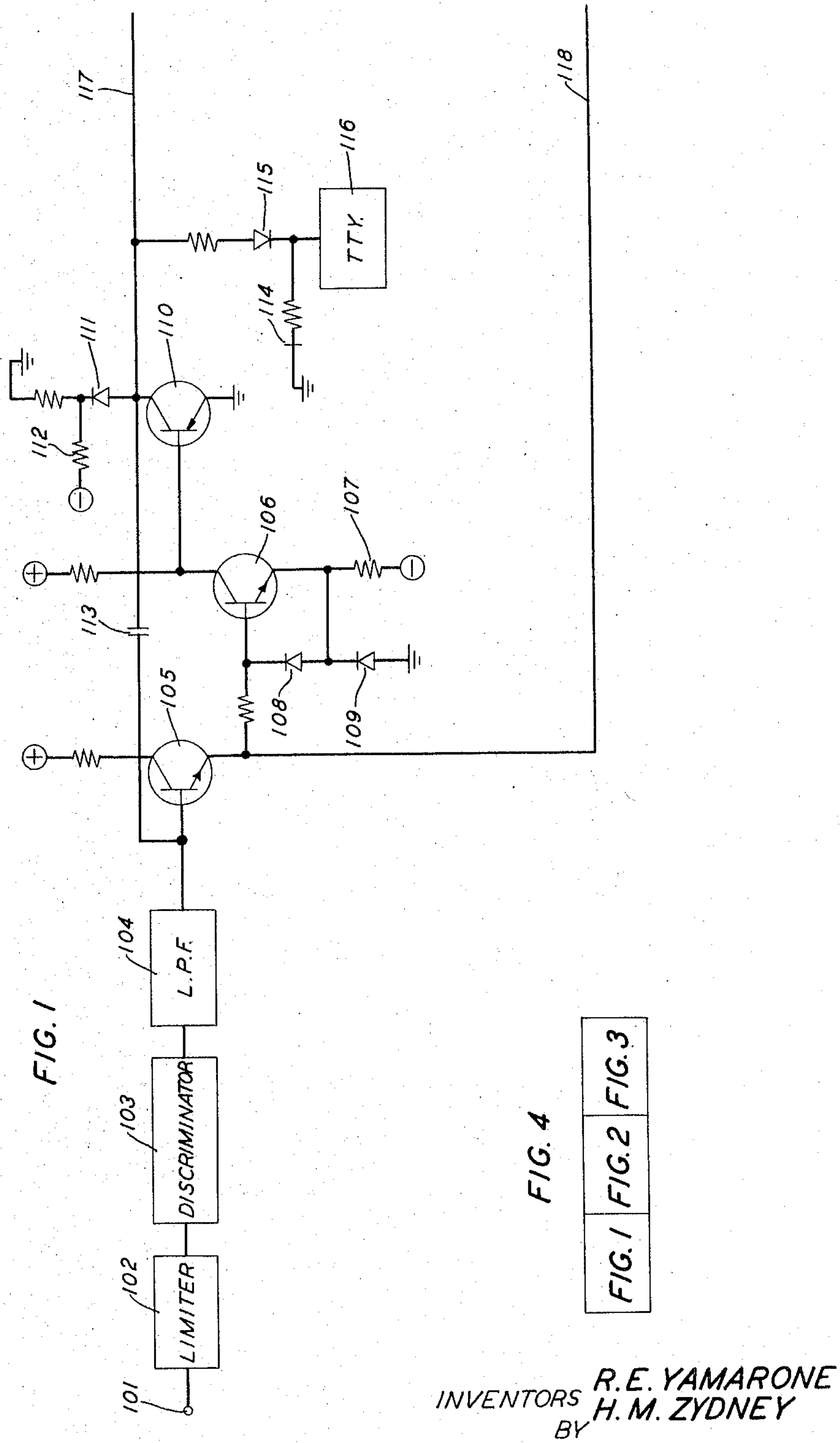
FIG. 1 shows a data set receiver.
FIG. 4 illustrates the arrangement of FIG. 1, FIG. 2, FIG. 3 and FIG. 4.

In several figures of the drawing, the relay contacts are shown detached from the relay winding and are identified by the designation for the relay core. Contacts which are closed when the associated relay is de-energized, known as "break contacts" are represented by a single short line perpendicular to the conductor line, while contacts which are closed when the relay is energized, known as "make contacts" are represented by two short cross lines diagonally intersecting the conductor line.

Referring now to FIG. 1, a limiter, generally indicated by block 102, has incoming signals applied thereto from lead 101. As disclosed in the above-identified application of T. L. Doktor et al., voice frequency marking and spacing signals are received from the telephone central office by a line circuit (not shown) which, in turn, applies the signals to limiter 102. The limited signals are then applied to the input of a discriminator, generally indicated by block 103, and discriminator 103 develops, at the output thereof, D.-C. signals corresponding to the received marking or spacing signals. Specifically, the reception of a marking signal results in a positive potential and the reception of a spacing signal results in a negative potential at the output of discriminator 103. The discriminator output is fed through low pass filter 104 to remove carrier ripple. Filter 104, in turn, is connected to the base of transistor 105 which is arranged as an emitter follower. The emitter of transistor 105 is connected to the base of transistor 106.

The emitter of transistor 106 is connected to the junction of resistor 107 and diode 109 which are connected to negative battery and ground, respectively. This renders the emitter of transistor 106 slightly negative with respect to ground. The base of transistor 106 is connected to the emitter by way of diode 108 providing a back bias to transistor 106. Thus when a negative spacing signal is applied to the base of transistor 105, the resultant negative emitter potential renders transistor 106 nonconductive. Conversely, a positive marking signal results in a positive potential on the emitter of transistor 105 turning ON transistor 106.

The collector of transistor 106 is connected to the base of transistor slicer 110. Negative battery is applied to the collector of transistor 110 through resistor 112 and diode 111. Thus, the application of a positive marking signal to the base of transistor 105 turns ON transistor 106 which, in turn, turns ON transistor 110 to apply ground to the collector thereof. Conversely, a negative spacing signal turns OFF transistor 110 to apply a negative potential to the collector. Capacitor 113, connected between the collector of transistor 110 and the base of transistor 105, provides regenerative feedback for insuring snap action of the slicer circuit.

The collector of transistor 110 is also connected by way of diode 115 to the select magnet (not shown) of teletypewriter 116. Normally closed contacts 114 of a connect relay (not shown) apply marking ground to the select magnet. When the connecting sequence is completed, however, the connect relay operates, as described in the above-identified application of T. L. Doktor et al., opening contacts 114. Thereafter, the reception of a marking signal applies ground from the collector of transistor 110 through diode 115 to teletypewriter 116 and the reception of a spacing signal turns OFF transistor 110, removing the collector ground and thus providing a no-current spacing condition to teletypewriter 116.

Lead 117 also extends from the collector of transistor 110. Ground is thus applied to lead 117 during the reception of a marking signal and negative battery is applied to lead 117 through resistor 112 and diode 111 during the reception of a spacing signal. Lead 117 extends to one input of the call progress tone detecting circuit shown in FIG. 2.

The emitter of transistor 105 is also connected to lead 118. Thus the application of a positive marking signal to the base of transistor 105 raises the potential of lead 118. Conversely, a negative spacing signal applied to the base of transistor 105 lowers the potential of lead 118. Lead 118 extends to another input of the call progress tone detecting circuit shown in FIG. 2.

It is recalled that the call progress tone comprises 25 milliseconds of marking tone alternating with 25 milliseconds of spacing tone. The tone interval, in turn, is then followed by a "no-tone" interval in which no signals occur. Accordingly, during the reception of the tone interval, an alternating 20 cycle per second wave is impressed on lead 118 and a square wave of alternating negative and ground pulses is impressed in lead 117.

Lead 118 is connected through capacitor 201 to the base of transistor 202. Transistor stage 202 is a high input impedance amplifier. The collector of transistor 202 is connected through capacitor 205 to the base of transistor 206. Transistor stage 206 comprises an emitter follower wherein the emitter is connected through resistor 208 to positive battery and the collector is connected through resistor 207 to negative battery. As the base of transistor 206 goes positive, its emitter follows thereby providing a positive potential thereat. Conversely, as the base of transistor 206 goes negative, the emitter provides a negative output potential.

The emitter of transistor 206 is connected to the junction of diode 209 and the emitter of transistor 211. Transistor 211, whose collector is connected to ground, has its base electrode connected to the base of transistor 213. The collector of transistor 213 is connected through resistor 214 to positive battery. The emitter of transistor 213 is connected through diode 212 to the junction of diode 209 and diode 210. Diode 210, in turn, is connected to ground.

When the emitter of transistor 206 goes positive, a positive potential with respect to ground is applied in series across the emitter-to-base junction of transistor 211, the base-to-emitter junction of transistor 213 and diodes 212 and 210. This forward biases transistors 211 and 213 and diodes 210 and 212. As disclosed in detail in the application of H. M. Zydney, Serial No. 248,145, filed concurrently herewith, when the positive potential exceeds the threshold of diodes 210 and 212, the diodes conduct. This permits current to flow through the collector-to-emitter path of transistor 213, causing the collector potential to be approximately ground.

When the emitter of transistor 206 goes negative, a negative potential with respect to ground is applied in series across diodes 209 and 212, the emitter-to-base path of transistor 213 and the base-to-collector path of transistor 211. Since the base of transistor 211 is made more negative than the collector, the transistor will operate with the collector acting as an emitter. Thus diodes 209 and 212 and transistors 213 and 211 are forward biased. When the negative potential exceeds the threshold of diodes 209 and 212, the diodes conduct. This permits current to flow through the collector-to-emitter path of transistor 213 causing the collector potential to be approximately ground. Accordingly, transistor 213 is rendered conductive when the mark or space pulses exceed a predetermined threshold, whereby the circuit functions as a signal rectifier.

The alternate mark pulses and space pulses of the tone interval have a rise and fall time which may be approximated as 3 milliseconds. Therefore, during the transition from mark to space or space to mark, the input potential to the signal rectifier does not exceed the threshold and transistor 213 stops conducting. Thus, during the tone interval the collector of transistor 213 is held near the ground potential with the exception that a positive potential is applied thereto via resistor 214 for an interval of 1.5 milliseconds every 25 milliseconds.

During the "no-tone" interval, no signals are applied to the base of transistor 206 and ground is applied to the base thereof through resistor 203. This maintains the emitter of transistor 206 at approximately a ground potential. With ground on the emitter of transistor 211 and on diode 209, transistor 213 cannot conduct. Accordingly, a positive potential is applied during the "no-tone" interval to the collector of transistor 213 by way of resistor 214.

The collector of transistor 213 is connected through Zener diode 215 to the junction of resistors 216 and 218. The other terminal of resistors 218 is connected to capacitor 217 and the other terminal of resistor 216 is connected to negative battery to form an integrating circuit.

During the "no-tone" interval, the positive potential on the collector of transistor 213 breaks down Zener diode 215 rendering the junction of resistors 216 and 218 positive. This charges capacitor 217 positive whereby a positive potential is applied through resistor 219 to the base of transistor 240. When the tone interval arrives, the collector of transistor 213 goes to ground lowering the potential at the junction of resistors 216 and 218 to ground. Capacitor 217, in turn, rapidly discharges through resistor 218 to the ground potential. At this point, Zener diode 215 is back biased and capacitor 217 discharges to negative battery through resistors 218 and 216. Thus, the positive potential applied to the base of transistor 240 is removed and a potential slightly negative with respect to ground is applied through resistor 219.

It is recalled that during the tone interval a 1.5 millisecond positive pulse is provided at the collector of transistor 213 every 25 milliseconds. This positive pulse breaks down Zener diode 215 reapplying a positive potential to the junction of resistors 216 and 218. Capacitor 217 starts to charge through resistor 218. At the termination of the 1.5 millisecond interval, however, the charge on capacitor 217 has not reached ground, the collector of transistor 213 restores to the ground potential back biasing diode 215 and capacitor 217 again discharges to negative battery through resistors 218 and 216. Thus the charge on capacitor 217 is maintained negative relative to ground.

In the event that noise received by the data set is passed by discriminator 103, noise pulses of relatively short duration would be passed by transistor 206 whereby a simulated tone signal is provided by transistor 213. Since the noise pulses are of relatively short duration, however, the interval between the positive pulses on the collector of transistor 213 due to the noise pulse transitions is substantially shorter than the pulse interval for the tone signal. The interval that capacitor 217 discharges to negative battery is therefore substantially shorter in duration whereby the charge is less negative than the charge developed by the tone signal. Accordingly, the positive pulse provided by the collector of transistor 213 and applied to the junction of resistors 216 and 218 charges capacitor 217 to a potential which is positive with respect to ground before the pulse terminates and capacitor 217 again discharges. It is thus seen that the charge on capacitor 217 is maintained negatively only so long as tone pulses are received and the pulse width exceeds a minimum interval.

It is also required of this circuit that it reject any marking or spacing tones persisting for a prolonged interval, since these tones may relate to signals other than the call progress tones. This is accomplished my making use of the square wave signal impressed on lead 117.

Figure 2:
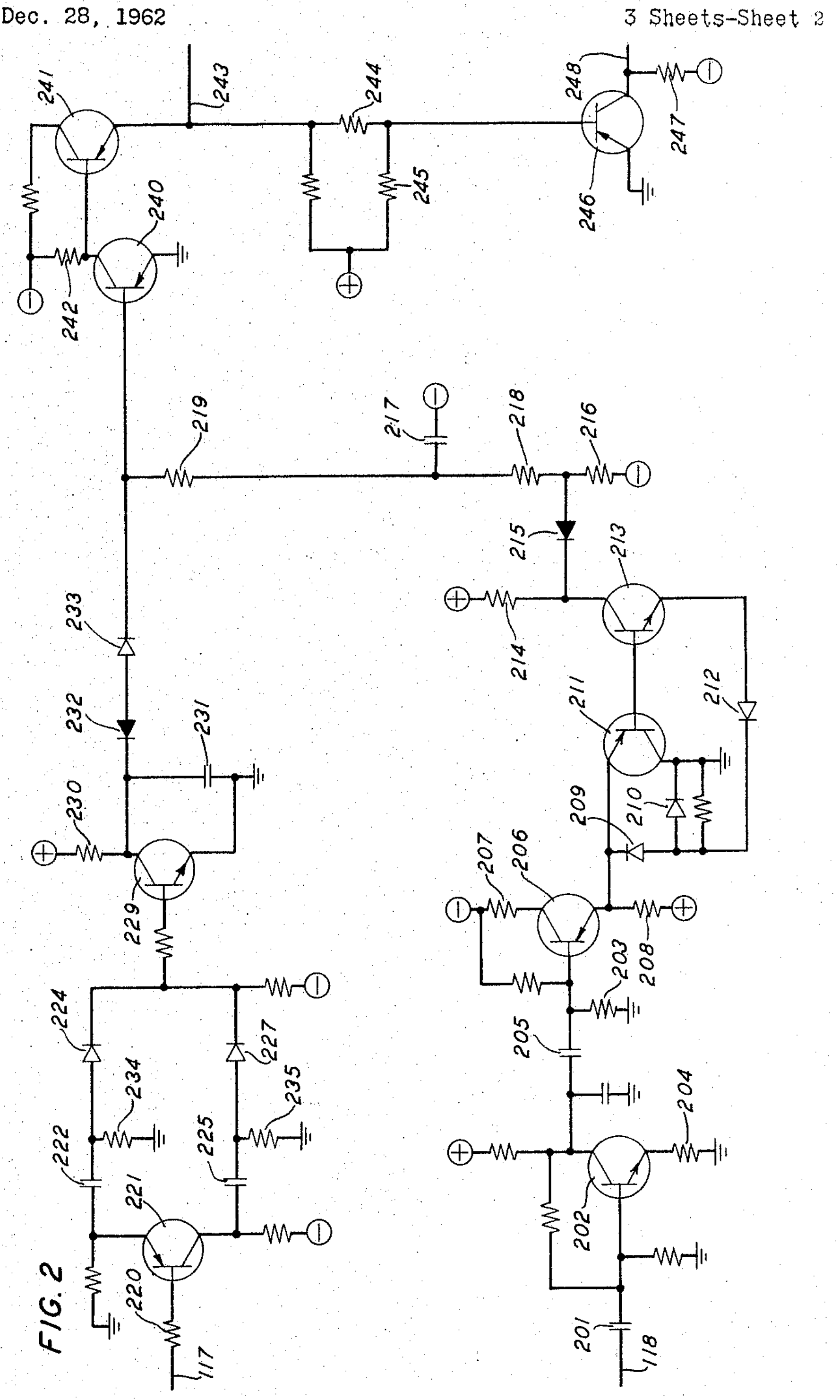
FIG. 2 shows a tone detecting circuit in accordance with this invention.

Lead 117 extends through resistor 220, FIG. 2, to the base of transistor inverter 221. Transistor inverter 221 has a first output, taken from the emitter thereof, and a second output, taken from the collector thereof, which two outputs provide complementary signals in accordance with the square wave applied to the base of transistor 221. The emitter of transistor 221 is connected in series with capacitor 222 and resistor 234 which constitute a differentiating circuit. A positive spike is thus obtained from each positive-going transistor of the wave on the emitter of transistor 221. This positive spike is passed by diode 224 to the base of transistor 229. The collector of transistor 221 is similarly connected to a differentiating circuit comprising capacitor 225 and resistor 235. Since the signal on the collector of transistor 221 is the complement of the emitter signal, a positive spike is thus obtained from the portion of the wave on the collector of transistor 221 corresponding to the negative-going transition of the wave on the emitter of transistor 221. This positive spike is passed by diode 227 to the base of transistor 229. Therefore positive pulses are applied to the base of transistor 229 having intervals of 25 milliseconds according to the transitions of the square wave on lead 117.

Each positive pulse on the base of transistor 229 causes the transistor to conduct momentarily. The conduction of transistor 229 applies ground to the junction of capacitor 231 and resistor 230 which constitutes an integrating circuit. In the interval between the pulses capacitor 231 charges towards positive battery via resistor 230.

Capacitor 231 is connected via Zener diode 232 and diode 233 to the base of transistor 240. So long as the charge on capacitor 231 is maintained close to ground, Zener diode 232 acts to block the application of the potential to the base of transistor 240. However, if a marking or spacing tone persists for an interval substantially exceeding 25 milliseconds, capacitor 231 charges sufficiently to break down Zener diode 232 causing the application of a positive potential through diode 233 to the base of transistor 240. It is thus seen that transistor 240 is turned OFF in the event that the pulse frequency of the tone signal falls below the predetermined minimum rate.

It is recalled that, during the reception of the tone signal, a negative charge is maintained on capacitor 217. With Zener diode 232 blocking the application of the charge on capacitor 231 during the tone interval, the negative charge on capacitor 217 renders the base of transistor 240 negative turning the transistor ON. This applies ground to the base of transistor 241 which is an emitter-follower. Accordingly, during the tone interval the emitter of transistor 241 is substantially at a ground potential. When the tone signal is not being receiver, such as during the no-tone interval, the base of transistor 240 is rendered positive turning the transistor OFF. The applies negative battery through resistor 242 to the base of transistor 241. Thus the emitter of transistor 241 is negative during the no-tone interval. When the emitter of transistor 241 is at ground, positive battery applied through resistor 245 to the base of transistor 246 turns the transistor OFF. This applies negative battery to lead 248 via resistor 247. When the emitter of transistor 241 is negative, the negative potential is applied to the base of transistor 246 via resistor 244. This turns transistor 246 ON applying ground to lead 248.

Lead 243 is connected to the emitter of transistor 241. Thus lead 243 is negative during the no-tone interval. As previously described, lead 248 is negative during the tone interval. Leads 243 and 248 extend to the call progress tone timing and logic circuit shown in FIG. 3.

Figure 3:
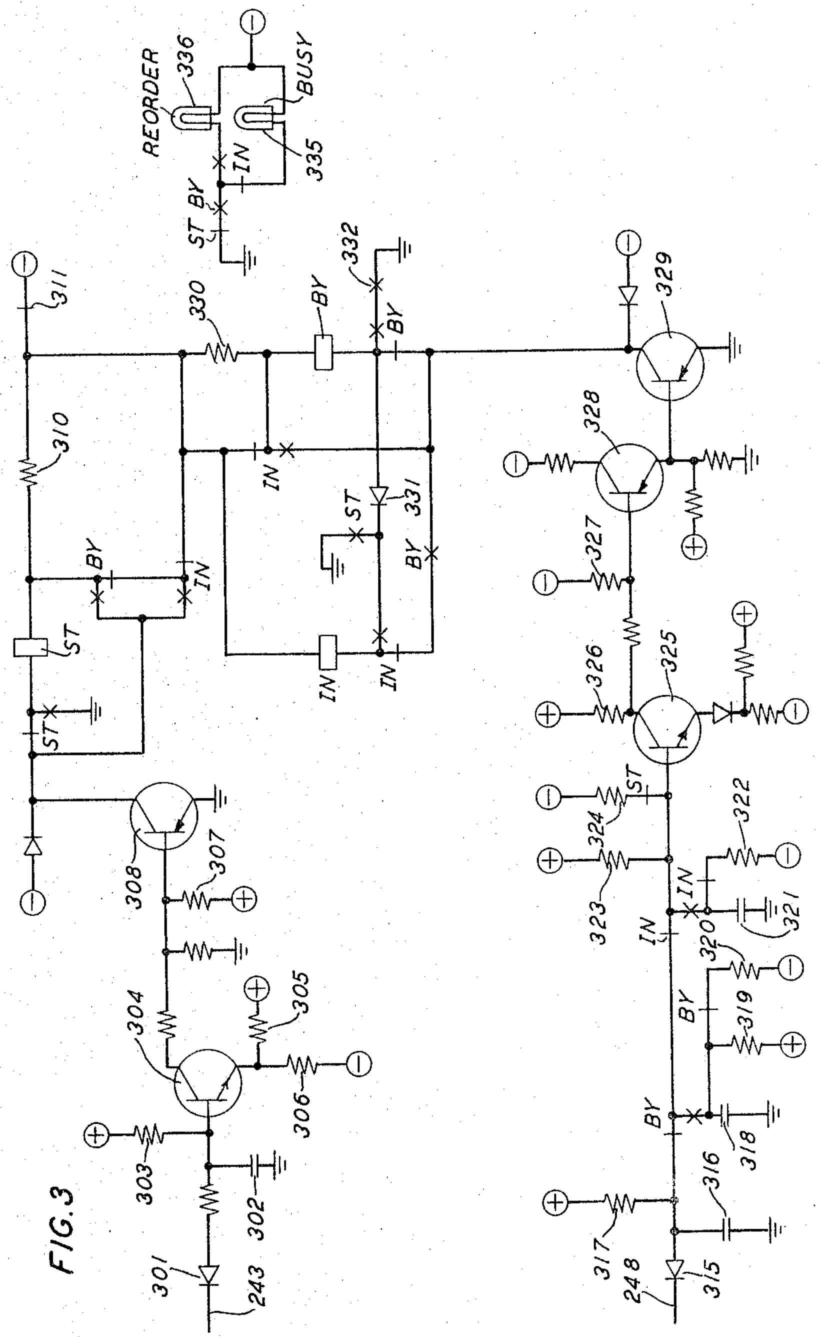
FIG. 3 shows a timing and logic circuit arranged to cooperate with the tone detecting circuit.

Lead 243 is connected through diode 301, FIG. 3, to the junction between timing capacitor 302 and the base of transistor 304. Prior to the reception of the tone signal, lead 243 is at a negative potential, as previously described. This negative potential is thus applied through diode 301 to the base of transistor 304, maintaining the transistor OFF.

When the tone is received the negative potential on lead 243 is removed. Capacitor 302 now proceeds to charge to positive battery by way of resistor 303. After about 75 milliseconds, capacitor 302 charges sufficiently to turn transistor 304 ON. Since the emitter of transistor 304 is connected to the junction of resistors 305 and 306, which comprise a voltage divider between positive battery and negative battery and the collector of transistor 304 extends to positive battery by way of resistor 307, the collector potential of transistor 304 is driven in a negative direction when the transistor is turned ON. This negative-going potential is applied to the base of transistor 308 and transistor 308 turns ON providing current through its emitter-to-collector path, the break contacts of relay ST, the winding of relay ST, resistor 310 or in shunt thereto the break contacts of relay BY and the break contacts of relay IN and normally-closed contacts 311 to negative battery. Accordingly, relay ST operates and locks to ground through its own make contacts. It is noted that normally-closed contacts 311 preferably comprise contacts of the above-identified connect relay which operates after the conclusion of the connecting sequence.

Lead 248 is connected through diode 315 to timing capacitor 316 and timing capacitor 316, in turn, is connected through the break contacts of relay BY and the break contacts of relay IN to the base of transistor 325. In the initial condition negative battery is applied through resistor 324 and the break contacts of relay ST to the base of transistor 325 and consequently to capacitor 316. Thus, initially transistor 325 is maintained OFF.

When relay ST operates, as previously described, the negative battery applied to the base of transistor 325 through resistor 324 is removed. So long as the tone interval persists, however, lead 248 has negative battery applied thereto, as previously described, whereby a negative potential is maintained on the base of transistor 325 through diode 315. At the conclusion of the tone interval, however, the negative potential on lead 248 is removed and capacitor 316 proceeds to charge to positive battery by way of resistor 317 and by way of resistor 323 and the break contacts of relays IN and BY. After about 170 milliseconds the charge on capacitor 316 and the corresponding potential on the base of transistor 325 is sufficiently positive to turn transistor 325 ON. With transistor 325 conducting, the positive potential applied through resistor 326 to the collector thereof is substantially reduced whereby the base of transistor 328 is rendered negative by the negative potential through resistor 327. This negative potential is followed by the emitter of transistor 328 and thus applied to the base of transistor 329, turning the latter transistor ON.

When transistor 329 turn ON current is applied through its emitter-to-collector path, the break contacts of relay BY, the winding of relay BY, resistor 330 or in shunt thereto the break contacts of relay IN and normally-closed contacts 311 to negative battery operating relay BY which locks to ground through its own make contacts and contacts 332 to ground. It is noted that contacts 332 correspond to make contacts of the originate relay disclosed in the above-identified application of T. L.

Doktor et al., which relay operates to close contacts 332 while the data set is making a call.

The operation of relay BY opens one of the previously-described operating paths for relay ST and connects the winding of relay ST to the collector of transistor 308. Since this is the "no-tone" interval, transistor 308 is not conducting and relay ST is maintained operated through resistor 310. Relay BY operated also opens the previously-described path connecting diode 315 and timing capacitor 316 to the base of transistor 325. In addition, relay BY operated removes the negative battery applied through resistor 320 to timing capacitor 318 and connects timing capacitor 318 to the base of transistor 325 by way of the break contacts of relay IN. Timing capacitor 318 now proceeds to charge to positive battery, by way of resistor 319 and by way of resistor 323, the break contacts of relay IN and the make contacts of relay BY.

If the tone signal is received at this time, transistor 308 is again rendered conductive, as previously described. This provides ground through the emitter-to-collector path of transistor 308 and the make contacts of relay BY to the winding of relay ST shunting relay ST and thereby releasing the relay. The release of relay ST again provides negative battery through resistor 324 to the base of transistor 325, maintaining the transistor OFF. In addition, relay ST released completes an energizing path for busy lamp 335 through the break contacts of relay ST, the make contacts of relay BY and the break contacts of relay IN. This provides an indication to the data set operator that a call progress tone corresponding to a busy signal has been received from the telephone office. The operator accordingly terminates the call thus releasing the originate relay to open contacts 332. This opens the locking path of relay BY and the release of relay BY returns the timing and logic circuit to its initial condition.

Assuming now that the "no-tone" interval persists, relay ST does not release. After about 600 milliseconds capacitor 318 charges sufficiently to turn transistor 325 ON. This applies a negative potential to the base of transistor 328 whereby transistor 329, in turn, is rendered conductive, as previously described. Ground is thereby applied through the emitter-to-collector path of transistor 329, the make contacts of relay BY, the break contacts of relay IN, the winding of relay IN, and contacts 311 to negative battery operating relay IN which locks to ground through its own make contacts and the make contacts of relay ST or diode 331, the make contacts of relay BY and contacts 332.

Relay IN operated opens the previously-described path connecting capacitor 318 to the base of transistor 325. In addition, relay IN operated removes negative battery applied to timing capacitor 321 by way of resistor 322 and extends timing capacitor 321 to the base of transistor 325. Accordingly, capacitor 321 starts to charge to positive battery by way of resistor 323 and the make contacts of relay IN. In addition, relay IN operated opens one of the operating and locking paths of relay BY and extends the winding of relay BY through the make contacts of relay IN to the collector of transistor 329. Since the operation of relay IN has restarted the timing cycle by transferring the base of transistor 325 to timing capacitor 318 to timing capacitor 321, transistor 329 is not conducting at this time and relay BY is maintained locked through resistor 330.

If the tone signal is received at this time with relays IN and BY operated, transistor 308 turns ON shunting down relay ST, as previously described. The release of relay ST reapplies negative battery through resistor 324 to the base of transistor 325, maintaining transistor 325 OFF. Relay ST released also opens one of the previously-described locking paths for relay IN. In addition, relay ST released completes an energizing path for recorder lamp 336 through the break contacts of relay ST, the make contacts of relay BY and the make contacts of relay IN. This indicates to the operator that a call progress tone corresponding to a "no-such-number" signal has been received from the telephone office. Accordingly, the operator terminates the call opening contacts 332. This opens the previously-described locking paths of relays IN and BY and the release of these relays restores the timing and logic circuit to the initial condition.

With relays IN, BY and ST operated, if the "no-tone" interval exceeds one second, this corresponds to the reception of an audible ring signal. At the termination of the one second interval, capacitor 321 has charged sufficiently to turn ON transistor 325. Transistor 325, in turn, applies a negative potential to the base of transistor 328 thereby turning ON transistor 329. Ground is thus extended through the emitter-to-collector path of transistor 329 and the make contacts of relay IN to the winding of relay BY, shunting down relay BY. With relay BY released, one of the previously-described locking paths for relay IN, through diode 331, is open. Relay IN, however, is maintained locked through the make contacts of relay ST. With relay IN maintained operated, the release of relay BY provides a new shunt down path for relay ST by way of the break contacts of relay BY and the make contacts of relay IN. Accordingly, the subsequent reception of the tone signal shunts down relay ST and relay ST released opens the locking path for relay IN to release the latter relay. In addition, relay ST reapplies negative battery to the base of transistor 325, as previously described. The timing and logic circuit is thus recycled and thereafter again monitors any call progress tone signals.

At the end of the connect sequence, when the message interval starts, the operation of the connect relay opens contacts 311. This opens the operating and locking paths for relays ST, IN and BY. The timing and logic circuit is thus disabled at the conclusion of the connect sequence.

Although a specific embodiment of this invention has been shown and described, it will be understood that various modifications may be made without departing from the spirit of this invention and within the scope of the appended claims.

What is claimed is:

1. In a circuit for detecting a call progress signal which includes a tone interval of alternate pulses and a no-tone interval, a transition detector operated by said tone pulses when the occurrence of the pulse transitions exceed a predetermined rate, a pulse width detector operated by said tone pulses when the pulses exceed a predetermined width, and a coincidence circuit normally operated to one of two states and operated to the other one of said two states in response to the joint operation of said pulse width detector and said transition detector.

2. In a circuit for detecting call progress signals which comprise tone intervals of alternate pulses and no-tone intervals, a transition detector for providing an output in response to each transition of said tone pulses, first means for integrating said transition detector output, a pulse width detector for providing an output in accordance with the duration of each of said tone pulses, second means for integrating said pulse width detector output, and a coincidence circuit normally operated to one of two states, said coincidence circuit including means jointly responsive to said first integrating means and said second integrating means for operating said coincidence circuit to the other one of said states.

3. In a circuit for detecting a tone signal which includes alternate pulses, a threshold circuit for passing the portion of said pulses which exceed in amplitude a predetermined threshold, an integrating circuit responsive to said pulses passed by said threshold circuit and arranged to provide an output when said passed pulses exceed a predetermined pulse width, a pulse detector responsive to said pulses and arranged to provide an output when the frequency of said pulses exceeds a predetermined frequency rate, and a coincidence circuit operated in response to the coincidence of the outputs of said integrating circuit and said pulse detector.

4. In a circuit for detecting a tone signal which includes alternate pulses, a full-wave signal rectifier for rectifying said pulses, threshold means connected to said rectifier for passing the portion of said rectified pulses which exceeds in amplitude a predetermined threshold, an integrating circuit responsive to said rectified pulses passed by said threshold means and arranged to provide an output when said passed pulses exceed a predetermined pulse width, a pulse detector responsive to said pulses and arranged to provide an output when said pulses exceed a predetermined frequency rate, and a coincidence circuit operated in response to the coincidence of the outputs of said integrating circuit and said pulse detector.

5. In a circuit for detecting a tone signal which includes alternate pulses having a frequency rate intermediate a maximum frequency and a minimum frequency, a transition detector responsive to the transition of said pulses and arranged to provide an output when the frequency of said pulse transitions exceeds the pulse transition frequency of pulses having said minimum frequency rate, a pulse width detector responsive to said pulses and arranged to provide an output when the width of said pulses exceeds the pulse width of pulses having said maximum frequency rate, and a coincidence circuit operated in response to the coincidence of the outputs of said pulse width detector and said transition detector.

6. In a circuit for detecting a tone signal which includes alternate pulses having a frequency rate intermediate a maximum frequency and a minimum frequency, a full-wave signal rectifier for rectifying said pulses, threshold means connected to said rectifier for passing the portion of said rectified pulses which exceeds in amplitude a predetermined threshold, a first integrating circuit responsive to said rectified pulses passed by said threshold means and arranged to provide an output when the width of said passed pulses exceeds the pulse width of passed pulses having said maximum frequency rate, a transition detector responsive to the transitions of said pulses, a second integrating circuit responsive to said transition detector and arranged to provide an output when the frequency of said pulse transitions exceeds the pulse transition frequency of pulses having said minimum frequency rate, a coincidence circuit operated in response to the coincidence of the outputs of said first integrating circuit and said second integrating circuit, and means for detecting the normal and operated conditions of said coincidence circuit.

7. In a circuit for detecting a tone signal which includes alternate pulses having a frequency rate intermediate a maximum frequency and a minimum frequency, a threshold circuit for passing the portion of said pulses which exceed in amplitude a predetermined threshold, a first integrating circuit responsive to said pulses passed by said threshold circuit and arranged to provide an output when the width of said passed pulses exceeds the pulse width of passed pulses having said maximum frequency rate, a transition detector responsive to the transitions of said pulses, a second integrating circuit responsive to said transition detector and arranged to provide an output when the frequency of said pulse transitions exceeds the pulse transition frequency of pulses having said minimum frequency rate, a coincidence circuit operated in response to the coincidence of the outputs of said first integrating circuit and said second integrating circuit, and means for detecting the normal and operated conditions of said coincidence circuit.

References Cited by the Examiner

UNITED STATES PATENTS

| | | | |
|---|---|---|---|
| 2,391,369 | 12/1945 | Volz | 340—167 |
| 2,419,292 | 4/1947 | Shephard | 340—167 |
| 2,456,825 | 12/1948 | Fitch et al. | 178—88 |
| 3,040,260 | 6/1962 | Nichols | 340—167 X |

NEIL C. READ, *Primary Examiner.*

H. I. PITTS, *Assistant Examiner.*